July 6, 1926.
J. A. MILLER
1,591,459
TIRE CARRIER AND RIM BREAKER
Filed Oct. 9, 1925
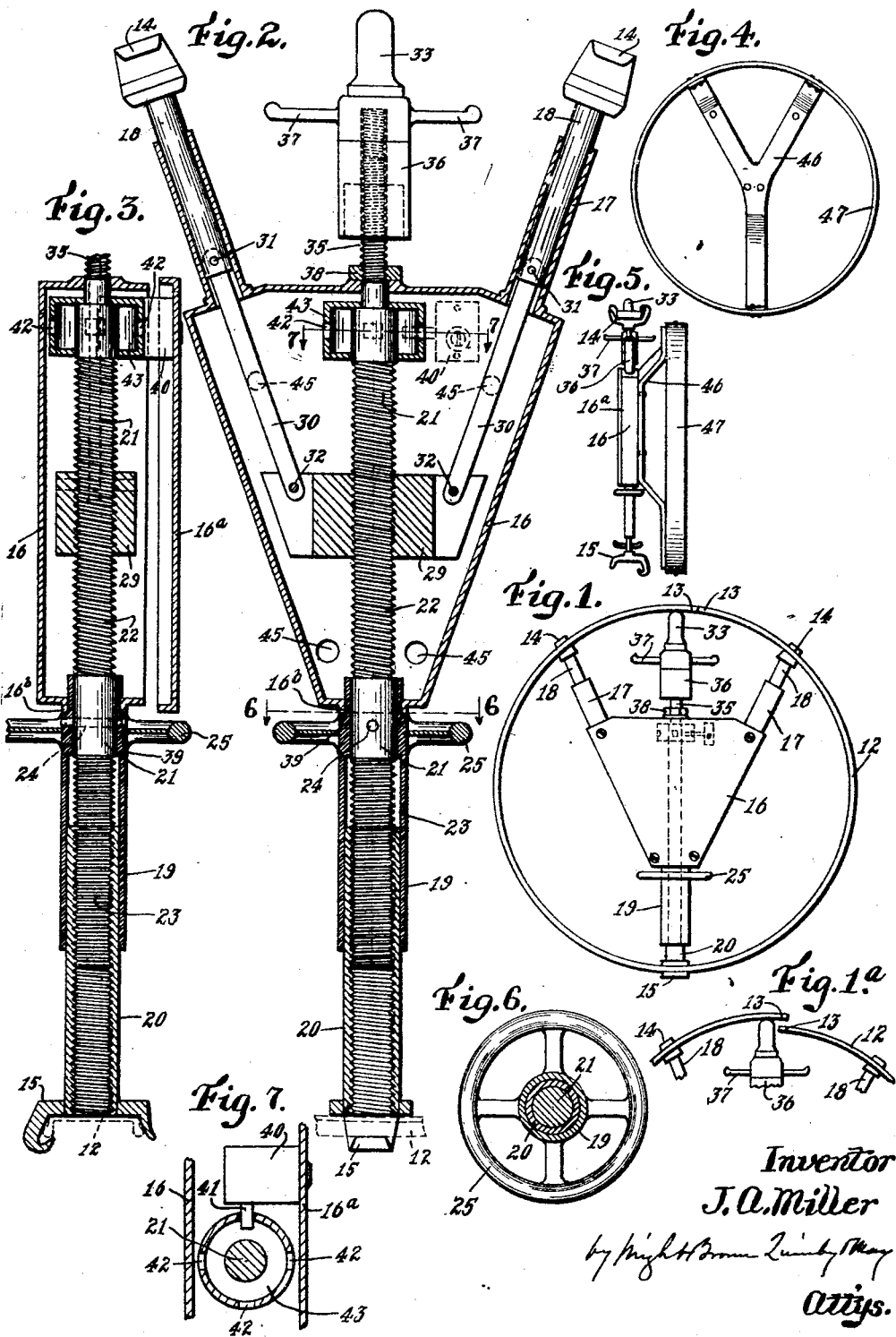
Inventor
J. A. Miller Patented July 6, 1926.

1,591,459

UNITED STATES PATENT OFFICE.

JACOB A. MILLER, OF BUFFALO, NEW YORK, ASSIGNOR TO ALEXANDER P. MACAULEY, OF BUFFALO, NEW YORK.

TIRE CARRIER AND RIM BREAKER.

Application filed October 9, 1925. Serial No. 61,450.

This invention relates to a device for carrying spare rims and tires, and for "breaking" or separating the ends of a rim.

The device is designed to engage the rim in three places, to provide a three-point support within the rim. By expanding the device so as to make the three supports fit snugly against the rim, the rim is securely held and the removal thereof may be prevented by locking the device.

In many cases, especially with the larger sizes of tires, the rim on which the tire is mounted is made in a split form with two abutting ends, instead of being a continuous rim. By separating the ends so that one can pass inwardly of and lap past the other, the rim is contracted materially to facilitate the mounting or removal of a tire. As the rim is usually made of heavy metal and the ends are often "frozen" together to a greater or less extent, by rust or dirt on the rim, it is frequently very difficult to separate the ends with the usual tools available.

This invention provides a simple, compact and effective mechanism for separating the ends and contracting the rim.

Since the device can be used as a spare tire holder, it can supplant the ordinary tire holder and thus supply a rim breaker with no increase in the weight or bulk of the accessories carried by the car. The device may be attached to a car by any preferred means, or may be included in the construction of a new car as part of its standard equipment.

For a more complete understanding of the structure of the device, together with further advantages inherent therein, reference is had to the drawings in which:—

Figure 1 is an elevation showing the device mounted within a rim.

Figure 1ª is a view similar to a portion of Figure 1, indicating the use of the device as a rim breaker.

Figure 2 is an elevation of the device with the casing partly broken away, to show the working parts.

Figure 3 is a view showing the box and other parts in section, and the spindle in elevation, parts shown at the upper end of Figure 2 being broken away.

Figure 4 is a side view of a supporting frame.

Figure 5 is an edge view, showing the device and the supporting frame.

Figure 6 is a section on line 6—6 of Figure 2.

Figure 7 is a section on line 7—7 of Figure 2.

The same reference characters indicate the same parts in all of the figures.

A demountable rim 12, divided so that it has relatively movable end portions 13, normally abutted together to render the rim practically continuous and adapted to be relatively moved to contract the rim and facilitate its entrance into a tire shoe or carcass, is engaged at a plurality of points by hooks constituting elements of the improved carrier. There are preferably three hooks, viz, two upper hooks 14, formed and arranged to engage the rim at points spaced from the end portions 13, and a lower hook 15, formed and arranged to engage the rim at a point diametrically opposite the end portions. The usual form of the hooks 14 and 15 is indicated by Figures 3 and 5, and the usual cross-sectional form of the rim is indicated by dotted lines in Figure 3. The hooks are movably supported and guided and are radially movable toward and from a common focal point by the means next described, so that they may be conformed to rims of different diameters, and may be caused to cooperate with the abutment hereinafter described in breaking the rim at the point where the end portions 13 meet, and thus contract the rim preparatory to the placing of a tire shoe thereon.

16 designates the body of an approximately triangular box. The body has an opening at one side, as shown by Figure 3, and this box includes a cover 16ª, closing said opening. Figure 3 shows the cover detached from the body 16. The wider end of the box is provided with diverging tubular upper guides 17, in which shanks 18, fixed to the upper hooks 14 are movable. The narrower end of the box is provided with a bearing 16ᵇ, in which is journaled a tubular lower guide 19, in which a shank 20, fixed to the lower hook 15, is movable. The shank 20 is internally threaded, as shown by Figures 2 and 3.

Journaled to rotate without endwise movement in the box, is a spindle 21, having an upper screw-thread 22 within the box, and a lower screw-thread 23 engaged with the internal thread of the shank 20 of the lower hook. The direction of the lower thread is opposite that of the upper thread, one being a right hand and the other a left hand thread.

The lower guide 19 is fixed, as by a pin 24, to the spindle 21, so that the spindle may be rotated by the guide which is preferably provided with a hand wheel 25.

29 designates a nut within the box, engaged with the screw-thread 22 of the spindle 21. The nut is connected with the shanks 18 of the upper hooks by links 30, pivoted at 31 to the shanks, and at 32 to the nut.

In the operation of the device thus far described, the upper and lower hooks may be retracted or moved toward the common focal point sufficiently to enable the upper portion of the rim 12 to be placed on the upper hooks 14, with the end portions 13 between said hooks, and the lower portion of the rim to be swung inward to position, to be engaged by the lower hook 15.

The adjustability of the hooks is sufficient to enable the holder to be used with rims differing considerably in diameter.

It will now be seen that when the lower guide 19 and the spindle 21 are rotated in one direction, the nut 29 and the upper hooks 14 are moved upward, and the shank 20 and the lower hook 15 are moved downward. The hooks are therefore pressed radially outward against the inner surface of the rim until the latter and a tire thereon are securely confined by the hooks, the end portions 13 of the rim being abutted together, as shown by Figure 1.

To enable the holder to be used as a rim breaker, or in other words, to offset the ends 13 from each other and thus permit the contraction of the rim, I provide a rim-breaking abutment 33, secured to the box and projecting between the upper hooks 14.

Said abutment is arranged to bear on the inner side of one of the end portions 13 of the rim, and is radially adjustable, so that it may be caused to break the rim as hereinafter described.

The abutment 33 is preferably supported by an externally threaded extension 35 of the spindle, projecting through an opening in the upper end of the box, the abutment being provided with an internally threaded shank 36, engaging the extension 35 and having handles 37 whereby it may be rotated to radially adjust the abutment. When it is desired to contract the rim and permit the removal of the tire therefrom, the spindle 21 is rotated in the direction required to move the hooks 14 and 15 inward, until the hooks no longer press the rim against the internal surface of a tire mounted thereon. The abutment 33 is then rotated on the threaded extension 35, in the direction required to adjust it outward against one of the end portions 13 of the rim, and press said end portion outward, thus breaking the rim and permitting the other end portion 13 to spring inward beside the end portion on which the abutment bears, as indicated by Figure 1ª, so that the rim is sufficiently contracted to permit the removal of the tire therefrom, and the application to the rim of a new tire. The abutment 33 is then adjusted inward until it is out of contact with the rim, and the hooks 14 and 15 are adjusted outward to expand the rim, press it against the inner surface of the new tire, and permit the end portions 13 of the rim to again abut against each other.

The inclination of the spindle thread 23 is preferably less than that of the thread 22, so that the rotation of the spindle moves the inner hook 15 inward more slowly than the outer hooks 12. The expansion of the rim is, therefore, effected mainly by the outward movement of the upper hooks.

Endwise movement of the spindle 21 in the box is prevented by a stop shoulder 38, which may be a nut engaged with the extension 35, and contacting with the upper end of the box, and a stop shoulder 39, formed on the lower guide 19, and contacting with the bearing 16ᵇ, at the lower end of the box.

To prevent unauthorized rotation of the spindle and movement of the hooks, I provide locking means adapted to lock the spindle to the box. Said means may be embodied in a lock including a casing 40, fixed to the cover 16ª, and a bolt 41, adapted to be projected by a suitable key into one of a plurality of orifices 42, in an annular keeper 43, fixed to the spindle 21. The keyhole of the lock opens on the outer side of the cover 16ª. When the lock bolt is engaged with the keeper, the spindle is prevented from rotating and the cover 16ª is confined against removal from the body of the box.

The box 16 may be fixed to any suitable portion of an automobile. In this instance, I show holes 45, in one side of the box, to receive screws or bolts attaching the box to a Y-shaped member 46, the ends of which are attached to a circular frame 47, which may be secured in any suitable way to the body of an automobile.

I use the words "upper" and "lower" in connection with the hooks and guides for convenience of description, and not in a limiting sense, it being obvious that it is not necessary that the hooks 14 be located higher than the hook 15, the essential arrangement being one which causes the hooks 14 to engage the rim at one side of the center of the circle of the rim, and the hook 15 to engage the rim at the opposite side.

I claim:

1. A tire-carrier comprising a box adapted to be attached to a vehicle and provided with a plurality of upper guides and a lower guide, said guides radiating from a common focal point, and upper and lower rim-engaging hooks having shanks movable in said guides, each hook being formed to bear on the inner surface of a demountable rim, manually operable means being provided for moving said hooks radially inward to permit the application of the rim to the hooks and radially outward to cause a holding engagement of the hooks with the rim, and a rim-breaking abutment secured to the box and projecting between the upper hooks, said abutment being arranged to bear on one of the end portions of a divided rim, and offset one of the end portions from the other.

2. A tire-carrier comprising a box adapted to be attached to a vehicle and provided with a plurality of upper guides and a lower guide, said guides radiating from a common focal point, and upper and lower rim-engaging hooks having shanks movable in said guides, each hook being formed to bear on the inner surface of a demountable rim, manually operable means being provided for moving said hooks radially inward to permit the application of the rim to the hooks, and radially outward to cause a holding engagement of the hooks with the rim, and a rim-breaking abutment secured to the box and projecting between the upper hooks, said abutment being arranged to bear on one of the end portions of a divided rim, and offset one of the end portions from the other, means being provided for varying the projection of the abutment from the box.

3. A tire-carrier comprising a box adapted to be attached to a vehicle and provided with a plurality of fixed upper guides and a rotatable lower guide, said guides radiating from a common focal point, upper and lower rim-engaging hooks having shanks movable in said guides, each hook being formed to bear on the inner surface of a demountable rim, a rotatable spindle extending through the box, and fixed to the lower guide, so that it is rotatable by the latter, said spindle having an upper threaded portion within the box, and a lower oppositely threaded portion within the lower guide engaged with an internal thread of the lower hook shank, a nut within the box engaged with the upper threaded portion, connections between the nut and the shanks of the upper hooks, the arrangement being such that rotation of the lower guide and the spindle moves the upper hooks in one direction, and the lower hook in the opposite direction, said spindle being provided with a screw-threaded extension projecting from the box between the upper hooks, and a rim-breaking abutment having an internally threaded shank engaged with said extension and adjustable by rotation thereon, said abutment being arranged to bear on one of the end portions of a divided rim and offset one of the end portions from the other.

4. A tire-carrier comprising a box adapted to be attached to a vehicle and provided with a plurality of fixed upper guides and a rotatable lower guide, said guides radiating from a common focal point, upper and lower rim-engaging hooks having shanks movable in said guides, each hook being formed to bear on the inner surface of a demountable rim, a rotatable spindle extending through the box, and fixed to the lower guide, so that it is rotatable by the latter, said spindle having an upper threaded portion within the box, and a lower oppositely threaded portion within the lower guide engaged with an internal thread of the lower hook shank, a nut within the box engaged with the upper threaded portion, connections between the nut and the shanks of the upper hooks, the arrangement being such that rotation of the lower guide and the spindle moves the upper hooks in one direction, and the lower hook in the opposite direction, and means for locking the spindle against rotation.

5. A tire-carrier comprising a box adapted to be attached to a vehicle and provided with a plurality of fixed upper guides and a rotatable lower guide, said guides radiating from a common focal point, upper and lower rim-engaging hooks having shanks movable in said guides, each hook being formed to bear on the inner surface of a demountable rim, a rotatable spindle extending through the box, and fixed to the lower guide, so that it is rotatable by the latter, said spindle having an upper threaded portion within the box, and a lower oppositely threaded portion within the lower guide engaged with an internal thread of the lower hook shank, a nut within the box engaged with the upper threaded portion, connections between the nut and the shanks of the upper hooks, the arrangement being such that rotation of the lower guide and the spindle moves the upper hooks in one direction, and the lower hook in the opposite direction, the box being composed of a body portion having a side opening and a cover adapted to close said opening, and locking means including a lock casing fixed to the cover, and a bolt movable in said casing, and an annular keeper fixed to the spindle within the casing and provided with a plurality of bolt-receiving orifices.

In testimony whereof I have affixed my signature.

JACOB A. MILLER.